(12) United States Patent
Vesikivi et al.

(10) Patent No.: US 7,373,400 B2
(45) Date of Patent: May 13, 2008

(54) SYSTEM AND METHOD FOR SESSION PROVISION

(75) Inventors: Petri Vesikivi, Espoo (FI); Pekka K. Viitaniemi, Espoo (FI); Janne Jalkanen, Helsinki (FI); Tommi Hakala, Espoo (FI)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 10/802,414

(22) Filed: Mar. 16, 2004

(65) Prior Publication Data

US 2005/0210264 A1   Sep. 22, 2005

(51) Int. Cl.
*G06F 15/173* (2006.01)

(52) U.S. Cl. ............... 709/223; 709/224; 709/203; 709/217; 713/170; 713/171

(58) Field of Classification Search .......... 709/203, 709/217, 219, 223–225; 370/222; 713/170, 713/171, 172
See application file for complete search history.

(56) References Cited

U.S. PATENT DOCUMENTS

| | | | |
|---|---|---|---|
| 6,006,331 A * | 12/1999 | Chu et al. | 726/5 |
| 6,161,182 A * | 12/2000 | Nadooshan | 713/172 |
| 6,614,351 B2 | 9/2003 | Mann et al. | |
| 7,028,090 B2 * | 4/2006 | McBrearty et al. | 709/229 |
| 2003/0005118 A1 * | 1/2003 | Williams | 709/225 |
| 2003/0197612 A1 | 10/2003 | Tanaka et al. | |
| 2005/0111457 A1 | 5/2005 | Kumar et al. | |
| 2006/0094421 A1 * | 5/2006 | Munje et al. | 455/427 |
| 2006/0184681 A1 * | 8/2006 | Bernardi et al. | 709/229 |

FOREIGN PATENT DOCUMENTS

| | | |
|---|---|---|
| JP | 2002-205823 | 7/2002 |
| WO | WO 99/17230 | 4/1999 |

OTHER PUBLICATIONS

International Search Report for PCT/US05/04966 completed Aug. 5, 2006.

* cited by examiner

*Primary Examiner*—LaShonda T Jacobs
(74) *Attorney, Agent, or Firm*—Morgan & Finnegan, L.L.P.

(57) ABSTRACT

Systems and methods applicable, for instance, in session provision. A node and/or other computer may, for example, dispatch to one or more servers and/or the like a message including a provided value and a value obtained, for instance, from a storage element. The one or more servers and/or the like may, for example, having performed various registration checks, act to create a token for provision to the node and/or other computer. Messages sent by the node and/or other computer including the token could, for instance, be considered to be associated with a session.

87 Claims, 7 Drawing Sheets

| user | A | B | C |
|---|---|---|---|
| personal tag ID | 5345 | 4345 | 3345 |
| phone number | 401111111 | 401111113 | 401111131 |
| unique ID | hjk | tps | kjl |
| location | BS1, BS2 | BS3, BS4, BS7 | BS5, BS6 |

SYSTEM AND METHOD FOR SESSION PROVISION

FIELD OF INVENTION

This invention relates to systems and methods for session provision.

BACKGROUND INFORMATION

In recent years, there has been an increase in the use of computers (e.g., portable computers) by various individuals. For example, delivery workers sometimes use computers to provide data regarding their performance of delivery tasks. As another example, medical workers sometimes use portable computers to provide data regarding their performance of patient care tasks.

Accordingly, there may be interest in technologies that, for example, facilitate the use of computers by workers and/or other individuals.

SUMMARY OF THE INVENTION

According to various embodiments of the present invention there are provided systems and methods applicable, for instance, in session provision.

A node and/or other computer may, in various embodiments, dispatch to one or more servers and/or the like a message including a provided value and a value obtained, for instance, from a storage element.

In various embodiments the one or more servers and/or the like might, having performed various registration checks, act to create a token for provision to the node and/or other computer. Messages sent by the node and/or other computer including the token could, in various embodiments, be considered to be associated with a session.

DETAILED DESCRIPTION OF THE INVENTION

General Operation

According to various embodiments of the present invention there are provided systems and methods applicable, for example, in session provision.

As is discussed in greater detail below, according to various embodiments a node and/or other computer may dispatch to one or more servers and/or the like a message including a provided value (e.g., a random number and/or the like) and a value obtained, for instance, from a storage element (e.g., a radio frequency identification (RFID) tag and/or the like).

Upon receipt of the message the one or more servers and/or the like may, in various embodiments, act to determine if the obtained value is registered (e.g., if the obtained value corresponds to an authorized user). Alternately or additionally the one or more servers and/or the like may, in various embodiments, act to derive an identifier corresponding to the node and/or other computer that dispatched the message, and/or to determine if such an identifier was registered (e.g., if the identifier corresponds to an authorized node and/or other computer).

In, for example, the case where the identifier and obtained value are registered, the one or more servers and/or the like may act to create a token. The one or more servers and/or the like may, in various embodiments, act to dispatch the dispatch the token to the node and/or other computer after receipt from the node and/or other computer of a message containing the provided value.

The node and/or other computer could, in various embodiments, act to include the token in messages sent to the one or more servers and/or the like. The one or more servers and/or the like could, for instance, consider such messages to be associated with a session.

Various aspects of the present invention will now be discussed in greater detail.

Token Provision

Figure 1:
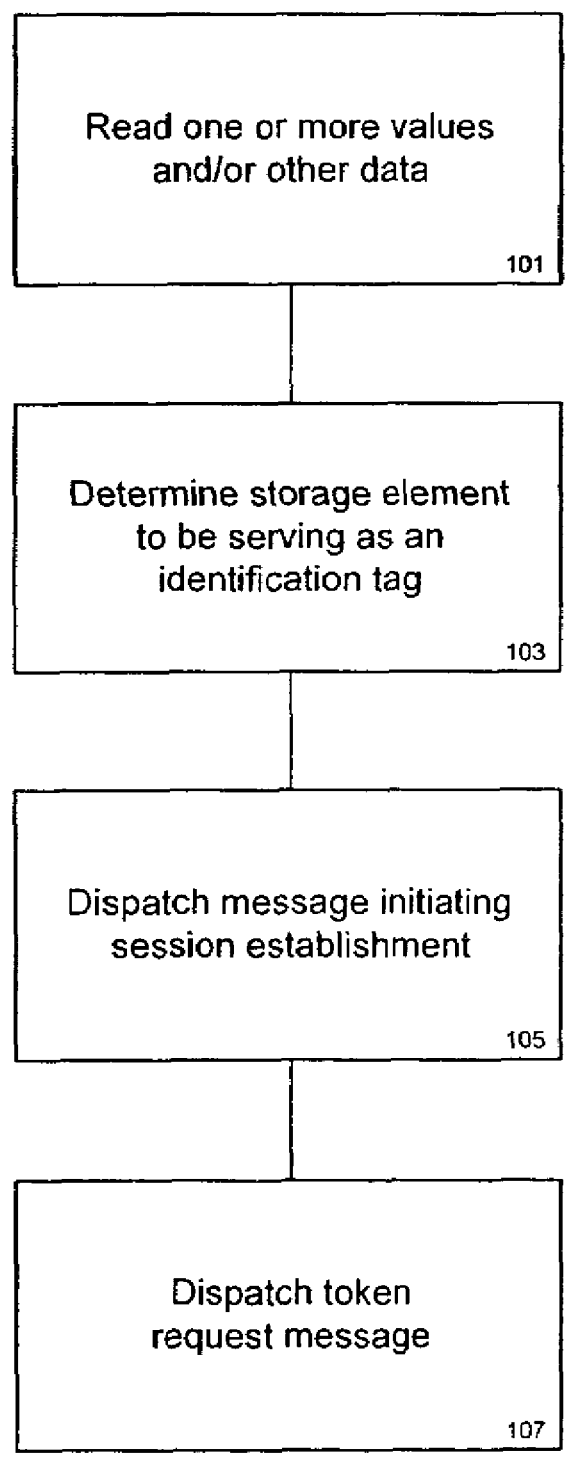
FIG. 1 is a diagram showing exemplary steps involved in token provision according to various embodiments of the present invention.

With respect to FIG. 1 it is noted that, according to various embodiments of the present invention a user's node and/or other computer might act to read one or more values and/or other data (e.g., a unique serial number) from a storage element such as, for instance, an RFID tag, an iButton, a barcode, a magnetic stripe, a smartcard, flash memory, memory accessible via Bluetooth, memory accessible via WiFi (e.g., IEEE 802.11b and/or IEEE 802.11g), memory accessible via Ultra Wide Band (UWB) and/or the like (step 101). Such UWB might, for instance, employ IEEE 802.15a, IEEE 802.15.3, and/or the like. Such a storage element might, for example, be provided to the user by a company and/or the like associated with the user (e.g., a company of which the user was an employee). The user might, in various embodiments, act to place such a storage element in communication with an appropriate reader, interface, and/or the like.

In various embodiments, the user might act to indicate to her node and/or other computer that it should act to read one or more values and/or other data from such a storage element. For instance, the user might press a button associated with her node and/or other computer, provide an indication via a graphical user interface (GUI), voice, and/or other interface provided by her node and/or other computer. Alternately or additionally, in various embodiments the user's node and/or other computer might act to automatically read one or more values and/or other data from such a storage element. For example, the node and/or other computer might periodically attempt to communicate with a storage element.

A reader, interface, and/or the like employed by the user's node and/or other computer could be implemented in a number of ways. For example, such a reader, interface, and/or the like might be integrated into the node and/or other computer, provided as an accessory, and/or the like. Such an accessory might, for example, be provided as a detachable functional cover and/or the like, and/or might communicate with the node and/or other computer via electrical conductors, wires, and/or the like, via fiber optics and/or the like, and/or via wireless communications and/or the like. Such wireless communications might, for instance, employ WiFi, UWB, Bluetooth, Infrared Data Association (IrDA), and/or the like.

In various embodiments, such a functional cover could include a store and/or the like accessible by a node and/or other computer to which the cover was installed, with the store and/or the like holding software employable by the node and/or other computer in performing various of the operations described herein. It is noted that, in various embodiments, as an alterative to and/or in addition to provision via a functional cover, software employable by the node and/or other computer in performing various of the operations described herein might be provided to the node and/or other computer in a number of ways.

For example, such software could be loaded onto the node and/or other computer via Bluetooth, UWB, WiFi, IrDA, Universal Mobile Telephone Service (UMTS), General Packet Radio Service (GPRS), Short Message Service (SMS), Multimedia Messaging Service (MMS), memory card, and/or the like. Such software might, for instance, be provided at time of manufacture of the node and/or other computer, after activation of the node and/or other computer, and/or the like.

Having read one or more values and/or other data from a storage element the node and/or other computer could, in various embodiments, act to determine whether the storage element serves as an identification tag for session initiation. Such functionality could be implemented in a number of ways. For example, one or more flags, values, bits, indicators, and/or the like among one or more values and/or other data from the storage element could serve to let the user's node and/or other computer know that the storage element served as an identification tag.

It is noted that a storage element of the sort described above could, in various embodiments, provide advantages to a user including, for instance, there being no need for the user to manually key-in and/or otherwise input her user identification information and/or the like prior to, for example, sending a message. Instead, according to various embodiments of the present invention, the user could, for example, touch, wipe, and/or the like the node and/or other computer with the storage element (and/or vice versa), and the node and/or other computer could recognize the storage element as being of a particular type (e.g., one that serves as an identification tag for session initiation).

Perhaps after having determined the storage element to be serving as an identification tag (step 103), the user's node and/or other computer could, in various embodiments, act to initiate session establishment. Initiating session establishment could, in various embodiments, involve preparing and dispatching a first message to one or more servers and/or the like providing session services.

Accordingly the user's node and/or other computer could, for instance, dispatch a SMS message and/or the like initiating session establishment to one or more servers and/or the like (step 105). Included in the message could, for instance, be a provided value (e.g., a random number and/or the like), some or all of the values and/or other data read from the storage element, and/or the like. It is noted that, in various embodiments, included with the message could be dedicated security information provided by the node and/or other computer.

As indicated above, in various embodiments, the above-described software employable by the node and/or other computer could recognize a storage element as serving as an identification tag for session initiation. In various embodiments, after so recognizing a storage element to be serving as an identification tag for session initiation, the node and/or other computer could act to automatically dispatch a message initiating session establishment. It is noted that, in various embodiments, the random number and/or the like could be created using some or all of the values and/or other data read from the storage element as a seed.

Figure 2:
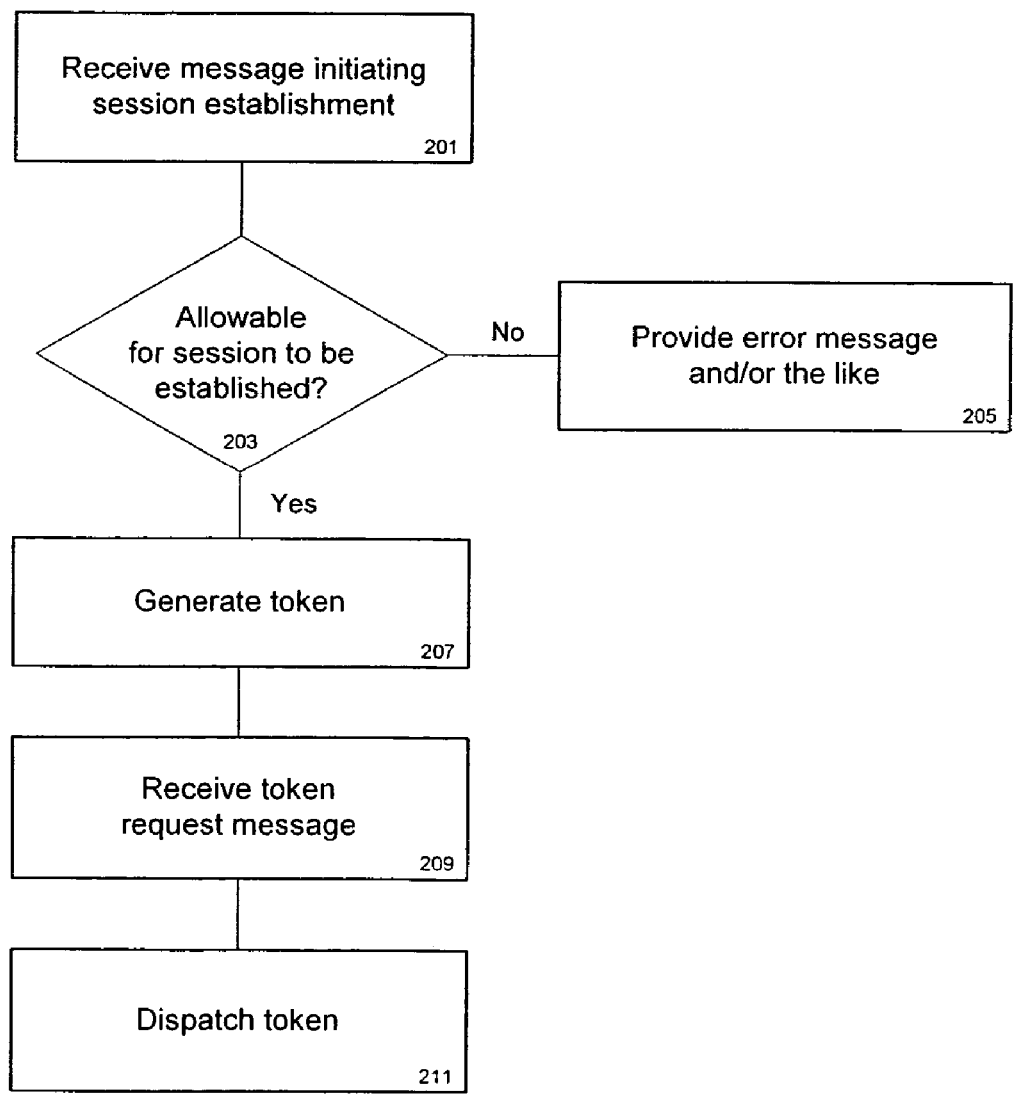
FIG. 2 is a diagram showing further exemplary steps involved in token provision according to various embodiments of the present invention.

With respect to FIG. 2 it is noted that, upon receiving the message initiating session establishment (step 201), the one or more servers and/or the like could, in various embodiments, act to determine if it was allowable for a session to be established (step 203). Accordingly the one or more servers and/or the like could, for instance, act to determine if the user's node and/or other computer was a registered node and/or other computer, and/or act to determine if the user was a registered user. It is further noted that, in various embodiments, one or more servers and/or the like could, alternately or additionally, act to check the validity of dedicated security information received along with the message.

Such functionality could be implemented in a number of ways. The one or more servers and/or the like could, for instance, act to determine if the user's node and/or other computer was a registered node and/or other computer by comparing an identifier associated with the node and/or other computer with a listing corresponding to registered nodes and/or other computers (e.g., a listing of identifiers associated with registered nodes and/or other computers). Such a listing might, for instance, be held in an accessible store and/or the like.

The one or more servers and/or the like might, for example, employ a phone number of the node and/or other computer as the identifier. Where, for instance, the message for initiating session establishment was sent via SMS and/or the like, the one or more servers and/or the like could, for instance, learn of the phone number and/or the like by way of data passed in association with SMS dispatch.

The one or more servers and/or the like could, for instance, act to determine if the user was a registered user by comparing some or all of the values and/or other data read from the storage element that were included in the dispatched message with a listing corresponding to registered users. Such a listing might, for instance, be held in an accessible store and/or the like. Accordingly, for example, in various embodiments the storage element of a user's node and/or other computer could be loaded with one or more particular data elements, and those data elements could be included in the listing and included in the dispatched message, thereby facilitating such comparison.

In various embodiments, in the case the one or more servers and/or the like determined that requirements had been met, the one or more servers and/or the like could proceed with session establishment. The requirements could, in various embodiments, be considered to be met, for example, in the case where the one or more servers and/or the like determined that the node and/or other computer was a registered node and/or other computer and that the user was a registered user. As another example, the requirements could, in various embodiments, be considered to be met in the case where the one or more servers and/or the like determined that that the node and/or other computer was a registered node and/or other computer, that the user was a registered user, and that the dedicated security information was valid.

The one or more servers and/or the like might, in various embodiments, provide an error message and/or the like to the user's node and/or other computer in the case where one or more requirements had not been met (step 205). Such an error message and/or the like might, for instance, be provided via SMS, MMS, GPRS, and/or the like.

According to various embodiments, in proceeding with session establishment the one or more servers and/or the like could act to generate a service token (step 207). The service token might, for example, comprise one or more random and/or non-random values, additional information, and/or the like. For instance, the service token might include a random 128-bit or 256-bit value.

In various embodiments, perhaps by action of the one or more servers and/or the like, an expiration date, validity period, and/or the like might be associated with the token. For instance, it might be established that the token expire after a specified date, after a specified period of time has elapsed, after a certain number of operations have been performed by the user's node and/or other computer (e.g., after a certain number of messages have been sent in conjunction with a session employing the token), and/or the like.

According to various embodiments, various factors might be taken into account in associating expiration dates, validity periods, and/or the like with a token. For example, the one or more identifiers, values, data, and/or the like associated with the node and/or other computer, the user, and/or the like might be taken into account. For instance, it might be specified in an accessible store and/or the like and/or the like that one or more specified users, groups of users, nodes and/or other computers, groups of nodes and/or other computers, and/or the like receive tokes with specified expiration dates, validity periods, and/or the like.

Accordingly, for example, it might be specified in such a store and/or the like that for all nodes and/or other computers, and/or users associated with a particular company and/or the like, tokens that expire after 8.5 hours be provided. The store and/or the like might, for instance, include a specification of the identifiers, values, data, and/or the like associated with nodes and/or other computers, and/or users associated with the company. Having generated the token, the one or more severs and/or the like might, in various embodiments, act to associate the generated token with a provided value (e.g., a random number) included with the message sent by the user's node and/or other computer initiating session establishment.

With further respect to FIG. 1 it is noted that, in various embodiments, the node and/or other computer could dispatch to the one or more servers and/or the like a token request message (step 107). The token request message could, for instance, be dispatched via GPRS and/or the like. Included with the token request message could, in various embodiments, be the provided value (e.g., the random number) that was included with the message initiating session establishment.

It is noted that, in various embodiments, tailored interfaces for specific companies and/or the like may be provided whereby, for instance, appropriate users associated with a company (e.g., company leaders, managers, and/or the like) can adjust various services, parameters, and/or the like based on the needs of the company and/or the like. It is further noted that, in various embodiments, the one or more servers and/or the like may provide schedules and/or the like. Such schedules might, for example, allow company leaders, managers, and/or the like to track employee actions, performance, and/or the like with respect to actions of the one or more servers and/or the like.

It is also noted that, in various embodiments, the tailored interfaces may be protected against possible misuse by, for instance, incorporating various security and/or authentication processes to be performed before allowing access. The authentication may be implemented in a number of ways such as, for example, requesting a secure Personal Identification Number (PIN) to be inputted before allowing access.

With further respect to FIG. 2 it is noted that, upon receiving a token request message (step 209), the one or more servers and/or the like could act to determine if a generated token had been associated with the provided value (e.g., the random number) included with the token request message. In the case where such a token existed, the one or more servers and/or the like could, in various embodiments, act to dispatch the token to the node and/or other computer (step 211). Such dispatch could, for instance, be via GPRS and/or the like.

It is noted that although various of the foregoing operations have, for purposes of illustration by way of ex ample, been described as being performed in a certain order, alternate orders are possible. For example, although as described above the one or more servers and/or the like perform generation of a token for association with a particular provided value (e.g., random number) before receiving a token request message including that provided value (e.g., random number), in various embodiments the one or more nodes and/or other computers could act to perform such token generation after receiving the token request message.

According to various embodiments of the present invention, the token request message could serve in initiation of an Internet Protocol (IP) connection, pipe, and/or the like. The token request message could, in various embodiments, be interpreted by the one or more servers and/or the like as an IP session request. Receiving the message, the one or more servers and/or the like could, perhaps in a manner analogous to that discussed above, act to determine if a valid token for the session was available. In various embodiments the one or more servers and/or the like could, upon receiving the IP session request, determine whether the random value included in the request corresponded with a value stored in connection with a valid token. Where a valid token was found to be available, the request could be accepted and the token could, perhaps in a manner analogous to that discussed above, be provided to the node and/or other computer.

Accordingly, in various embodiments, the node and/or other computer, and/or the user of the node and/or other computer, are identified by way of the random value generated by the user's node and/or other computer, which is firstly dispatched to the one or more servers and/or the like in a form of the first message via a cellular messaging service, such as, for example, via SMS or MMS messaging service. In various embodiments, thereafter, when dispatching the token request message/IP session request, the same random value can be included in the request, which can be used by the one or more servers and/or the like to identify the source of the request, such as for example, a virtual IP address of 255.255.255.126 as the same node and/or other computer that dispatched the first message having phone number of +1226345621. In various embodiments, after the one or more servers and/or the like have made the association between the dynamic IP address and the phone number of the node and/or other computer, the IP session can be established between the one or more servers and/or the like and the node and/or other computer based on the information stored in connection with the one or more servers and/or the like.

Token Use

Figure 3:
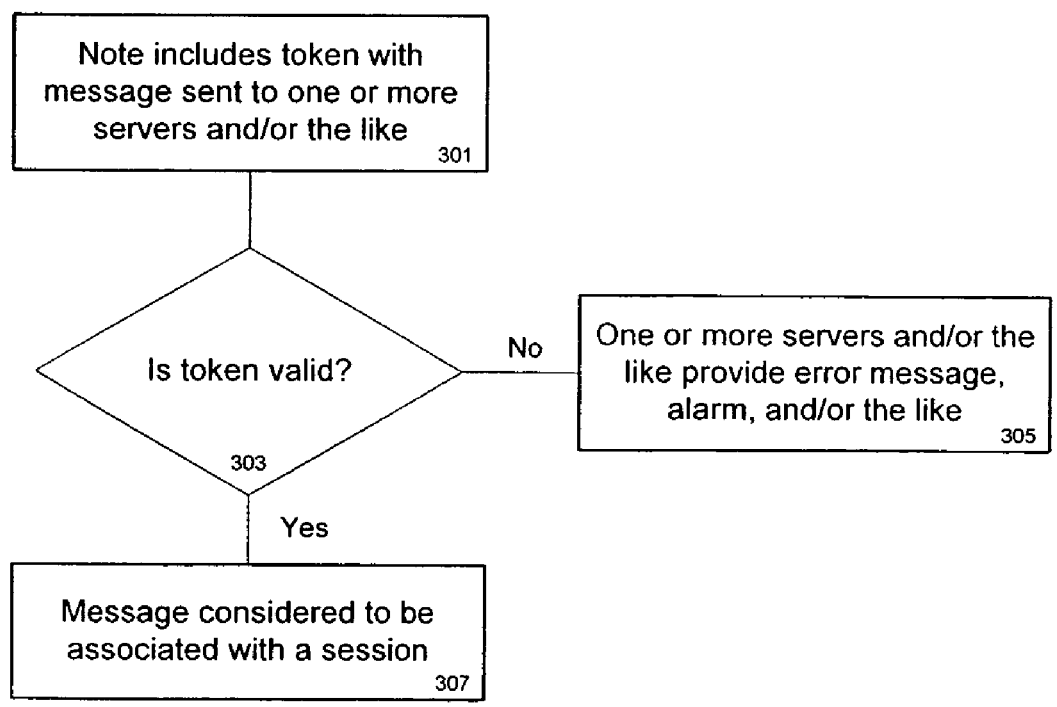
FIG. 3 is a diagram showing exemplary steps involved in token use according to various embodiments of the present invention.

According to various embodiments of the present invention, the users node and/or other computer could employ a received token of the sort discussed above in carrying on a session with the one or more servers and/or the like. With respect to FIG. 3 it is noted that, for example, according to various embodiments the user's node and/or other computer could include the token with messages sent to the one or more servers and/or the like as part of the session (step 301). Such messages could, for example, be dispatched via GPRS and/or the like.

Upon receipt of such a message, the one or more servers and/or the like could, in various embodiments, act to determine if the token was valid (step 303). Determination of whether or not the token was a valid could, for instance, involve determining if the token was a token that had been generated by the one or more servers and/or the like, and/or determining that the token had not expired.

Determination that the token had been generated by the one or more servers and/or the like might, for example, involve the one or more servers and/or the like consulting an accessible store and/or the like holding tokens that had been generated and/or data corresponding thereto. Determination of whether or not the token had expired could, for example, involve consultation of a store and/or the like associating generated tokens with associated expiration dates, validity periods, and/or the like. As another example, such determination could include, in embodiments where the token included data corresponding to expiration dates, validity periods, and/or the like, consultation of the token.

In the case where it was found that the token was not valid, one or more operations could be performed. For example, in various embodiments the one or more servers and/or the like might, perhaps via SMS, MMS, GPRS, and/or the like, provide an error message, alarm, and/or the like to the user's node and/or other computer, to a company and/or the like associated with the user and/or the user's node and/or other computer, and/or the like (step 305). The error message, alarm, and/or the like might, for instance, indicate that the token was no longer valid, invite the node and/or other computer and/or its user to take action to seek a new token, and/or the like.

Responsive to such a message alarm, and/or the like the user's node and/or other computer might, for instance, act to perform one or more of the operations discussed above (e.g., dispatching a token request message). In various embodiments, the node and/or other computer might, perhaps via a GUI or other interface, request that its user place the storage element in communication with an appropriate reader, interface, and/or the like, and/or the like.

In various embodiments, in the case where it was found that the token was valid the message with which the token was included could, perhaps by the one or more servers and/or the like, be considered to be associated with a session corresponding to the token (step 307). In various embodiments the one or more servers and/or the like might, for instance, act to record in an accessible store and/or the like data corresponding to such a received message, data extracted from such a received message, and/or the like.

It is further noted that, in various embodiments, the one or more servers and/or the like might dispatch to the user's node and/or other computer a message indicating that the message dispatched by the user's node and/or other computer had been successfully received. Such a message indicating successful receipt might, for example, contain information chosen by a system administrator, a company associated with the user and/or the node and/or other computer, and/or the like. In various embodiments, among the chosen information might be a user-specific message.

A session of the sort described herein, where tokens are included with messages dispatched from the user's node and/or other computer to the one or more servers and/or the like, could be employed for a number of purposes. For example, in a number of professions a user acts to visit a number of stations, the user perhaps needing to visit the stations in accordance with one or more specified visiting sequences, needing to visit the stations at particular times, needing to visit the stations within particular time windows, needing to perform certain tasks at stations, and/or the like.

For example, a user working as a watchperson might need to periodically visit locations in a building, on grounds, and/or the like. As another example, a user working as an inspector might need to visit certain storage tanks, containers, water meters, electric meters, gas meters, various municipal meters, and/or the like, with one or more corresponding values (e.g., one or more storage tank pressures, water use readings, and/or the like according to gauges, meters, and/or the like) perhaps needing to be ascertained.

As further examples, workers such as delivery workers or medical workers may need to visit various locations and/or perform various tasks at those locations. According to various embodiments of the present invention, a user could employ her node and/or other computer in conjunction with a session of the sort described herein to send to the one or more servers and/or the like data corresponding to the performance of her duties as worker.

For example, according to various embodiments of the present invention, location-based storage elements might be placed at the locations such a user was to visit. Such location-based storage elements might, for instance, be implemented as RFID tags, iButtons, barcodes, magnetic stripes, smartcards, flash memories, memories accessible via Bluetooth, memories accessible via WiFi, memories accessible via UWB and/or the like. Upon visiting a location, the user's node and/or other computer could, in various embodiments, act to read one or more values and/or other data from one or more location-based storage elements at that location.

It is noted that, in various embodiments, among the one or more values and/or other data held by a located-based storage element could be one or more serial numbers and/or other unique values that, dispatched to the one or more servers and/or the like, could be taken as evidence that the user had visited the location and/or the like corresponding to the location-based storage element. It is noted that, in various embodiments, perhaps in a manner analogous to that discussed above, the user might act to place the location-based storage element in communication with an appropriate reader, interface, and/or the like.

In various embodiments, having read one or more values and/or other data from a location-based storage element, the node and/or other computer could act to send to the one or more servers and/or the like one or more messages corresponding to the reading of the location-based storage element, each such message including the token. Such dispatch could, for example, be performed in a manner analogous to that discussed above (e.g., via SMS and/or using the existing GPRS session, wherein the token can be used as identifying the user and/or the current operations/services). Included with the message could, for example, be one or more of the values and/or other data read from the location-based storage element.

Alternately or additionally, included with the message could be, for example, data supplied by the user, data received from a data source at a location and/or the like (e.g., a gauge, meter, and/or the like providing its output via Bluetooth, UWB, WiFi, electrical conductors, and/or the like), a timestamp, and/or the like. The data for such a timestamp might, for example, be provided by a location-based storage element at the location.

The user might so supply data, for instance, via a GUI or other interface provided by the node and/or other computer. For example, the user might supply one or more comments regarding her visiting of the location. It is noted that, in various embodiments, a data source at the location and/or the like might provide its output to the location-based storage element. Accordingly, for example, a location-based storage element for a storage tank with a pressure gauge, meter, and/or the like might store a reading periodically received from the gauge, meter, and/or the like, and the gauge reading could be accessible by the user's node and/or other computer via the storage element.

Receiving the message the one or more servers could, in various embodiments, perform one or more of the operations discussed above such as confirming the validity of the token associated with the message, considering the message to be associated with a session corresponding to the token, and/or recording in an accessible store and/or the like data corresponding to the message, data extracted from the message, and/or the like.

In various embodiments, the one or more servers and/or the like could, act to send a confirmation message to the user, the message perhaps indicating that it had been recognized that the user had visited the location. Such a message and/or a subsequent message might, in various embodiments, provide information relating to a subsequent task to be performed by the user (e.g., a location to be visited). Such a message might, for instance, be dispatched via GPRS and/or the like. Information regarding the subsequent task might, for instance, be drawn from information provided by, for example, a system administrator, a company and/or the like associated with the user and/or her node and/or other computer, and/or the like.

In various embodiments, the one or more servers and/or the like might act to provide various messages and/or information to a user at a location. As an example, when a user employs her node and/or other computer to read a storage element (e.g., an RFID tag) of an electric meter, the one or more servers and/or like might dispatch, upon receiving the storage element information of the electric meter from the node and/or other computer, the last value of the electric metering device that they had received, so the that the user at the location could easily see what has happened to the metering device since that last reading event. In various embodiments, if the reading was the same, it might be thought to be likely that the electric metering device was broken, and that it should be replaced with a new one.

It is further noted that, in various embodiments, the one or more servers and/or like might also provide some additional information to a user at a location. The information could include information such as, for example, instructions relating to the operations necessary at the location and/or information relating to actions to be done after leaving the location (e.g., route information in a form of, for instance, a map to a next control point, location, and/or the like).

It is noted that, in various embodiments, the one or more servers and/or the like might act to provide various messages, alarms, and/or the like in response to various conditions. Such messages, alarms, and/or the like might, for instance, be sent to the user, a company and/or the like associated with the user, and might, for instance, be dispatched via GPRS and/or the like.

For example, such a message, alarm, and/or the like might be sent in the case where one or more activities and/or the like were performed by the user, were one or more activities and/or the like were not performed by the user, and/or the like. The activities and/or the like for which such messages, alarms, and/or the like would be dispatched might, for example, be specified by a system administrator, a company and/or the like associated with the user and/or her node and/or other computer, and/or the like.

For example, it might be specified that the company and/or the like be notified in the case where the one or more servers and/or the like stopped receiving indications that the user has been visiting assigned stations. As another example, it might be specified that the company and/or the like be notified in the case that the one or more servers and/or the like receiving and/or failing to receive messages from the node and/or other computer was indicative to the one or more servers and/or the like that the user had deviated from a predefined visiting schedule and/or the like.

Such a schedule and/or the like might, for instance, be accessible by the one or more servers and/or the like, and/or be provided by the company and/or the like. In various embodiments such a schedule and/or the like might, in accordance with that which is discussed above, specify one or more times, time windows, and/or the like. Responsive to such a notification the company and/or the like might, in various embodiments, contact police and/or other authorities, take action to see that the user was not in danger, and/or the like.

Such action might, for example, include performing a check via security monitoring, attempting to contact the user via her node and/or other computer, and/or the like. Such contact via the user's node and/or other computer might, for instance, involve dispatch of a text, visual, and/or other messages sent via SMS, MMS, GPRS, and/or the like, and/or the use of voice communications. Such voice communications might, for example make use of Global System For Mobile Communications (GSM) voice capability of the node and/or other computer, UMTS voice capability of the node and/or other computer, and/or the like.

As indicated above, in various embodiments, among the one or more values and/or other data held by a location-based storage element could be one or more serial numbers and/or other unique values that, dispatched to the one or more servers and/or the like, could be taken as evidence that the user had visited the location and/or the like corresponding to the location-based storage element. It is noted that, in various embodiments, such one or more serial numbers and/or other unique values could change periodically.

Accordingly, for example, the one or more serial numbers and/or other unique values for a particular location-based storage element could change in accordance with a schedule. The one or more servers and/or the like, and/or one or more companies and/or the like associated with a user could, in various embodiments, be aware of this schedule and/or could perform one or more operations to ensure that the one or more serial numbers and/or other unique values indicated as being read from a location-based storage element were correct according to the schedule.

In various embodiments, in the case where the one or more serial numbers and/or other unique values indicated as being read from the location-based storage element were not in compliance with the schedule (e.g., they were out of date), action might be taken to, for instance, investigate whether the user was attempting to feign having visited a location.

It is noted that, in various embodiments, the distance traveled by a user during, for instance, her shift (e.g., as a watchperson, inspector, and/or the like), a session, and/or the like could be determined. Such functionality could be implemented in a number of ways. For example, in various embodiments, location-based storage elements placed at locations the user was to visit could be employed as location anchors.

In various embodiments, by taking into account the geographical locations of location-based storage elements visited by the user, the distance traveled by the user could be computed. Such computation could, in various embodiments, be performed by the one or more servers and/or the like. The geographical locations of storage elements could be known in a number of ways. For example, an accessible store and/or the like could correlate data held by location-based storage elements (e.g., serial numbers and/or other unique values) with locations. Accordingly, for instance, the one or more servers and/or the like receiving, perhaps in a manner analogous to that discussed above, such a serial number and/or other unique value could consult such a store and/or the like to determine a corresponding geographical location.

As another example, in various embodiments a location-based storage element could hold data regarding its location, and such data could, for example, be read from the storage element by the user's node and/or other computer and passed, perhaps in a manner analogous to that discussed above, to the one or more servers and/or the like.

The functionality by which a location-based storage element could come to hold data about its geographical location could be implemented in a number of ways. For example, in various embodiments the storage element could, perhaps in a manner analogous to that discussed above with respect to a storage element receiving readings from a gauge, meter, and/or the like, receive an indication of its location from an apparatus. For instance, such an apparatus might provide geographical location information to the storage element via Bluetooth, UWB, and/or the like. The functionality by which such an apparatus could determine the geographical location information to be provided to the storage element could be implemented in a number of ways. For example, such determination could involve the use of Global Positioning System (GPS), cellular-based techniques (e.g., Enhanced Observed Time Difference (E-OTD)), and/or the like.

Exemplary Aspects

Figure 4:
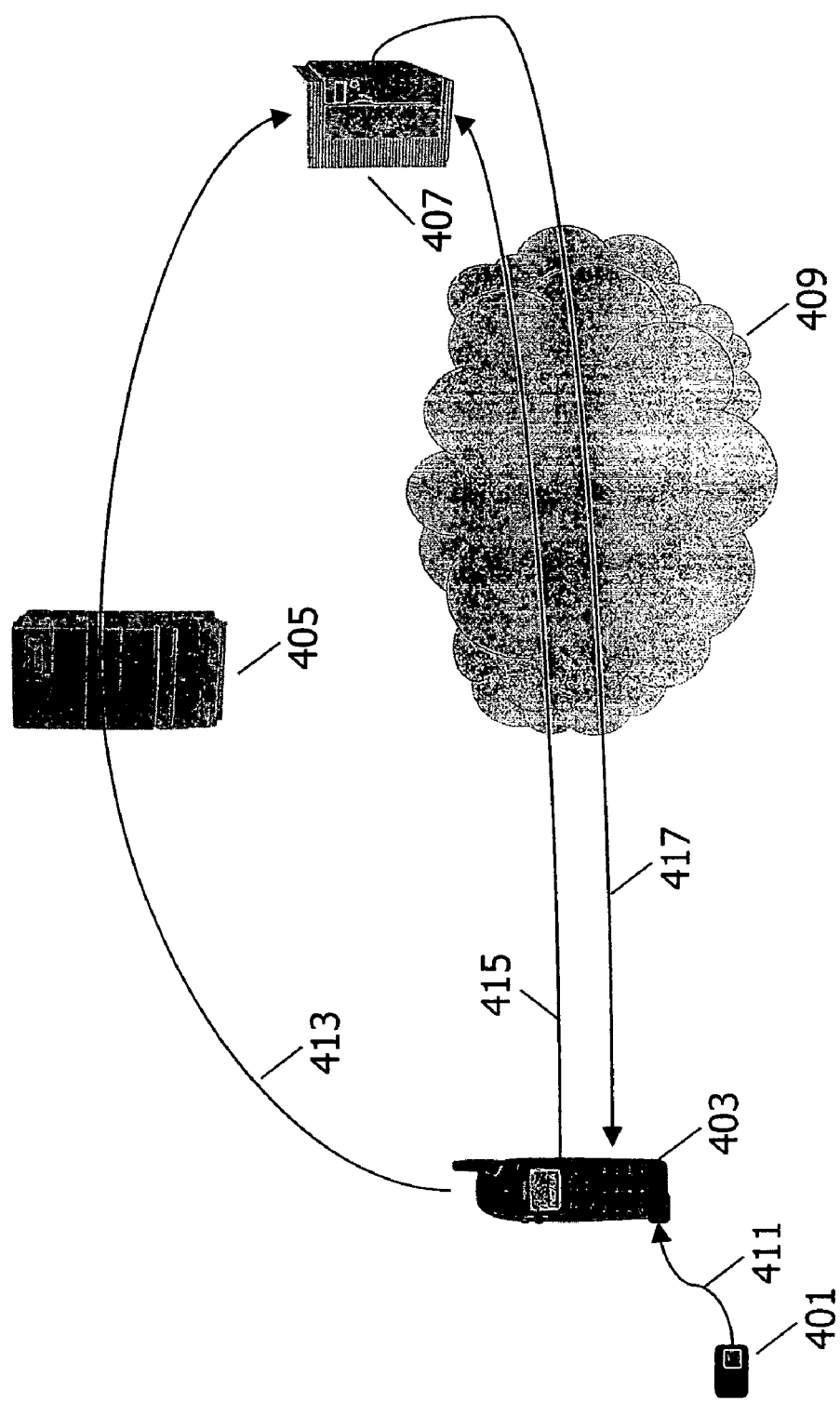
FIG. 4 shows an exemplary configuration employable in various embodiments of the present invention.

Shown in FIG. 4 is an exemplary configuration employable in various aspects of the present invention. Included in FIG. 4 are storage element 401 (e.g., an RFID tag), node and/or other computer 403, SMS service center 405, one or more servers and/or the like 407, and GPRS network 409.

According to various embodiments of the present invention, one or more values and/or other data could, perhaps in a manner analogous to that discussed above, be received from storage element 401 by node and/or other computer 403 via communication 411 (e.g., via an RFID communication). In accordance with that discussed above, node and/or other computer 403 could, in various embodiments, act to dispatch a message initiating session establishment 413. Message 413 could, for example, be received at SMS service center 405 and passed on to one or more servers and/or the like 407.

Also in accordance with that discussed above, node and/or other computer 403 could, in various embodiments, act to dispatch via GPRS network 409 to one or more servers and/or the like 407 token request message 415. In accordance with that discussed above, token request message 415 could, in various embodiments, be interpreted by one or more servers and/or the like 407 as an IP session request.

In various embodiments, after receiving the message, one or more servers and/or the like 407 could act in accordance with that discussed above to provide an appropriate token to the node and/or other computer via message 417 dispatched via GPRS network 409. In accordance with that discussed above, an IP session with node and/or other computer 403 could, for example, be established by one or more servers and/or the like 407.

As indicated above, according to various embodiments of the present invention the one or more servers and/or the like might place data into and/or read data from one or more accessible stores and/or the like. Shown in FIG. 5 is an exemplary table showing various data which, in various embodiments, might be held in such stores and/or the like.

Figure 5:
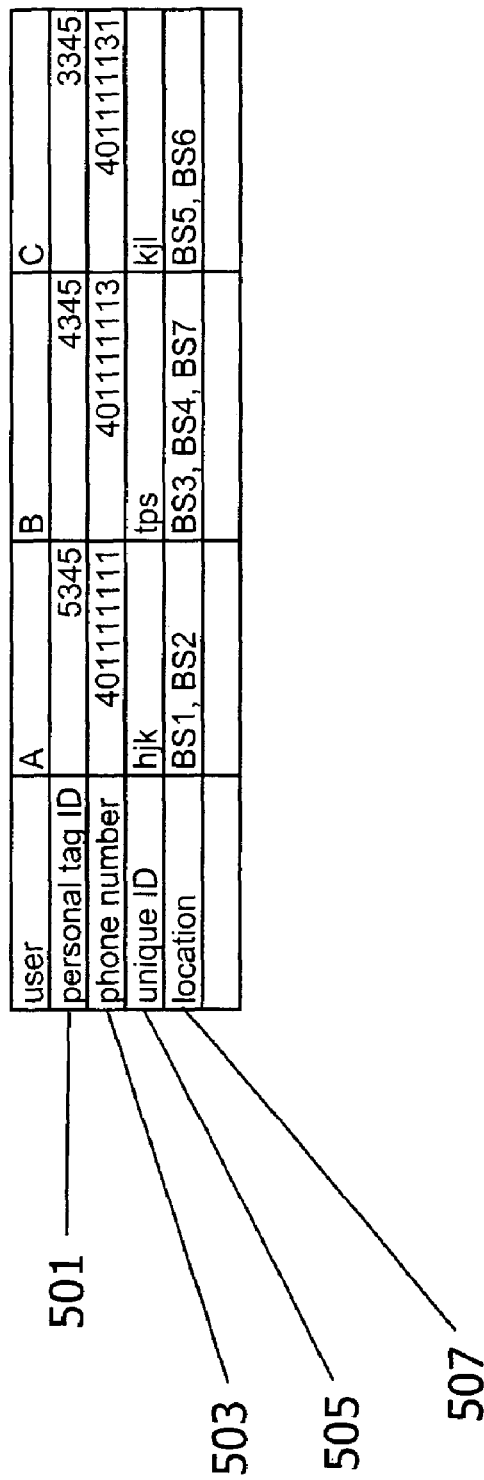
FIG. 5 is an exemplary table showing various data held in various embodiments of the present invention.

Shown in the exemplary table of FIG. 5 for each of users A, B, and C is personal tag ID data 501 (e.g., corresponding to values and/or other data of the sort discussed above read from storage elements provided to users), phone number data 503, unique ID data 505 (e.g., token values), and location data 507 (e.g., corresponding to visited locations).

Hardware and Software

Various operations and/or the like described herein may be executed by and/or with the help of computers. Further, for example, devices described herein may be and/or may incorporate computers. The phrases "computer", "general purpose computer", and the like, as used herein, refer but are not limited to a processor card smart card, a media device, a personal computer, an engineering workstation, a PC, a Macintosh, a PDA, a portable computer, a computerized watch, a wired or wireless terminal, phone, node, and/or the like, a server, a network access point, a network multicast point, a set-top box, a personal video recorder (PVR, a game console, or the like, perhaps running an operating system such as OS X, Linux, Darwin, Windows CE, Windows XP, Windows Server 2003, Palm OS, Symbian OS, or the like, perhaps employing the Series 60 Platform and/or Series 90 Platform, and perhaps having support for Java and/or .Net.

Figure 6:
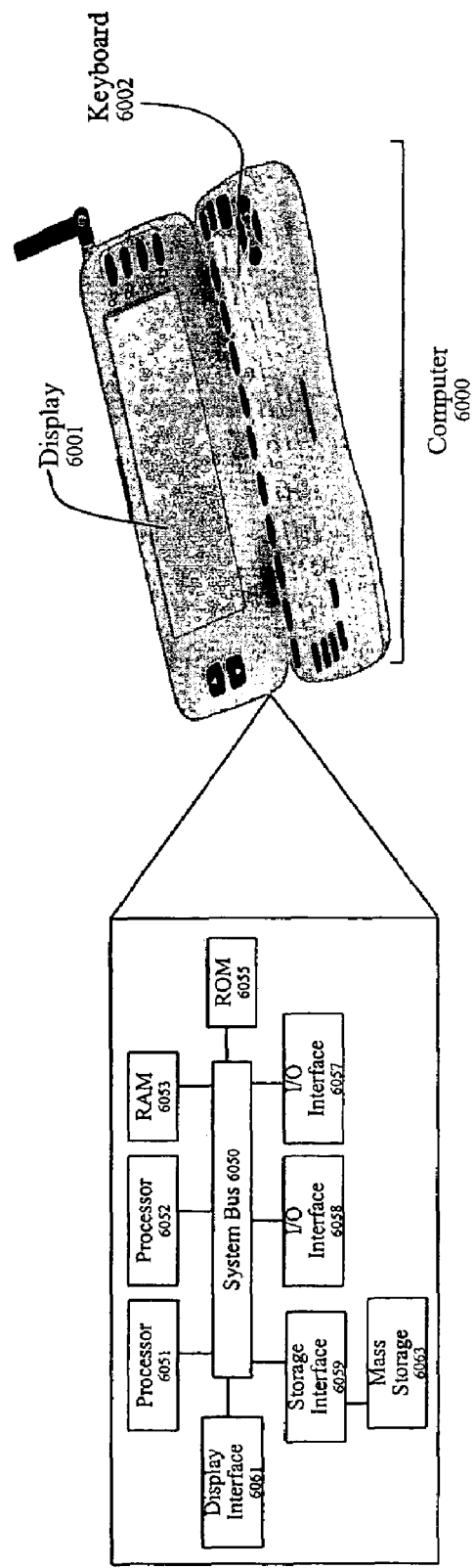
FIG. 6 shows an exemplary computer employable in various embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 6000 as shown in FIG. 6 includes system bus 6050 which operatively connects two processors 6051 and 6052, random access memory 6053, read-only memory 6055, input output (I/O) interfaces 6057 and 6058, storage interface 6059, and display interface 6061. Storage interface 6059 in turn connects to mass storage 6063. Each of I/O interfaces 6057 and 6058 may be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, terrestrial digital video broadcast (DVB-T), satellite digital video broadcast (DVB-S), digital audio broadcast (DAB), general packet radio service (GPRS), Universal Mobile Telecommunications Service (UMTS), DVB-H, IrDA (Infrared Data Association), and/or other interface known in the art.

Mass storage 6063 may be a hard drive, optical drive, or the like. Processors 6051 and 6052 may each be a commonly known processor such as an IBM or Motorola PowerPC, an AMD Athlon, an AMD Opteron, an Intel ARM, an Intel XScale, a Transmeta Crusoe, a Transmeta Efficeon, an Intel Xenon, an Intel Itanium, or an Intel Pentium. Computer 6000 as shown in this example also includes a touch screen 6001 and a keyboard 6002. In various embodiments, a mouse, keypad, and/or interface might alternately or additionally be employed. Computer 6000 may additionally include or be attached to card readers, DVD drives, floppy disk drives, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, and/or Xen according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 7:
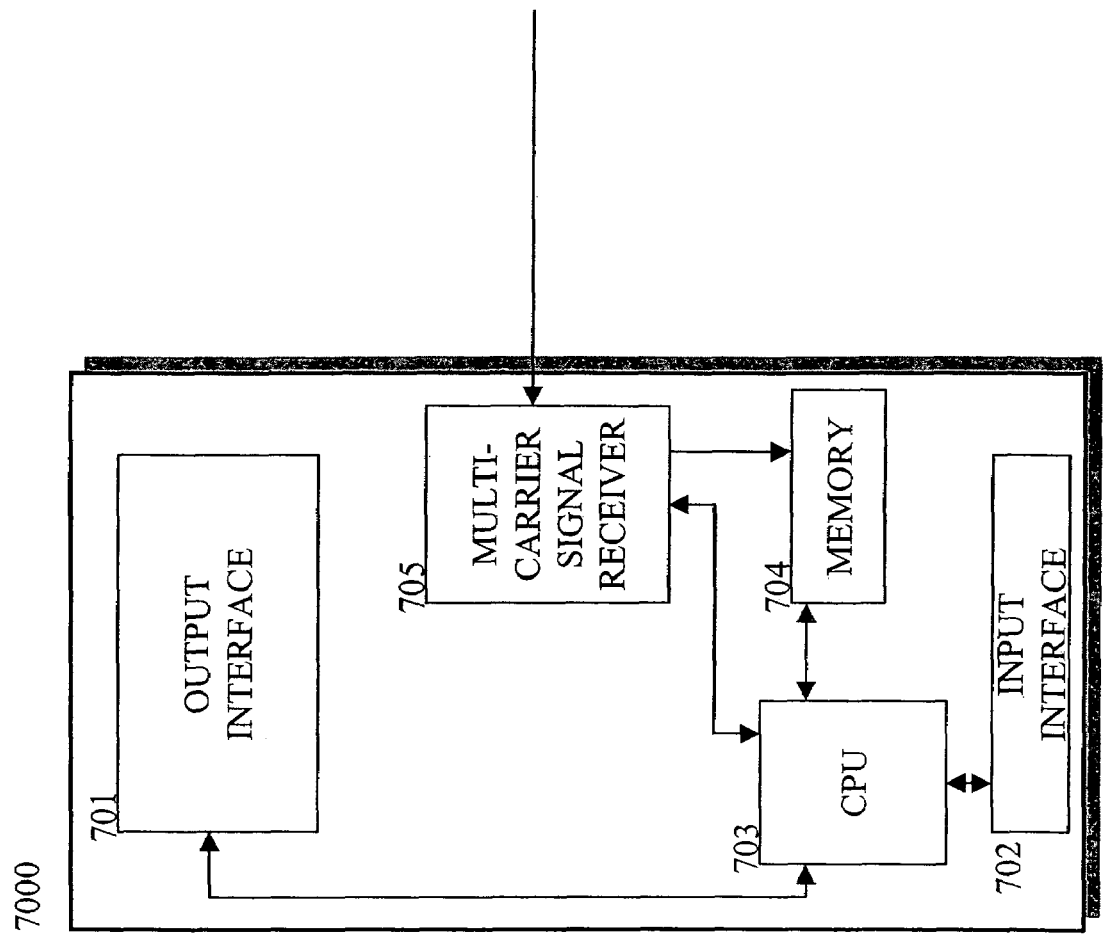
FIG. 7 shows a further exemplary computer employable in various embodiments of the present invention.

Shown in FIG. 7 is a block diagram of a terminal, an exemplary computer employable in various embodiments of the present invention. The terminal of FIG. 7 has been discussed in the foregoing. In the following, corresponding reference signs have been applied to corresponding parts. Terminal 7000 of FIG. 7 may be used in any/all of the embodiments described herein. The terminal 7000 comprises a processing unit CPU 703, a multi-carrier signal terminal part 705 and a user interface (701, 702). The multi-carrier signal terminal part 705 and the user interface (701, 702) are coupled with the processing unit CPU 703. One or more direct memory access (DMA) channels may exist between multi-carrier signal terminal part 705 and memory 704. The user interface (701, 702) comprises a display and a keyboard to enable a user to use the terminal 7000. In addition, the user interface (701, 702) comprises a microphone and a speaker for receiving and producing audio signals. The user interface (701, 702) may also comprise voice recognition (not shown).

The processing unit CPU 703 comprises a microprocessor (not shown), memory 704 and possibly software. The software can be stored in the memory 704. The microprocessor controls, on the basis of the software, the operation of the terminal 7000, such as the receiving of the data stream, the tolerance of the impulse burst noise in the data reception, displaying output in the user interface and the reading of inputs received from the user interface. The operations are described above. The hardware contains circuitry for detecting the signal, circuitry for demodulation, circuitry for detecting the impulse, circuitry for blanking those samples of the symbol where significant amount of impulse noise is present, circuitry for calculating estimates, and circuitry for performing the corrections of the corrupted data.

Still referring to FIG. 7, alternatively, middleware or software implementation can be applied. The terminal 7000 can be a hand-held device which the user can comfortably carry. Advantageously, the terminal 7000 can be a cellular mobile phone which comprises the multi-carrier signal terminal part 705 for receiving the multicast transmission stream. Therefore, the terminal 7000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method for session establishment, comprising:
    receiving a first message including a first value and a second value;
    deriving from the first message a node identifier;
    determining if the second value corresponds to a registered user;
    determining if the node identifier corresponds to a registered node;
    creating a token in response to determination that the first message was initiated by a registered user with a registered node;
    receiving a second message, wherein the second message is a session initiation request message; and
    dispatching the token in response to receipt of the second message and determination that the second message includes the first value.

2. The method of claim 1, wherein the first value is a random number.

3. The method of claim 1, wherein the second value was retrieved by a user node from a storage element.

4. The method of claim 3, wherein the storage element is a radio frequency identification tag.

5. The method of claim 3, wherein the storage element is a smartcard.

6. The method of claim 1, wherein the first value is calculated based on the second value.

7. The method of claim 1, further comprising receiving one or more messages including the token.

8. The method of claim 7, wherein the messages including the token are considered to be associated with a session.

9. The method of claim 7, wherein one or more of the messages including the token correspond to locations visited by a user.

10. The method of claim 9, wherein one or more of the messages including the token include data read from one or more storage elements at one or more of the locations.

11. The method of claim 9, wherein one or more of the messages including the token are considered to be indicative that one or more of the locations have been visited.

12. The method of claim 7, wherein one or more of the messages including the token correspond to tasks performed by a user.

13. The method of claim 12, wherein one or more of the messages including the token include data corresponding to one or more of the tasks.

14. The method of claim 1, wherein the token comprises an 128-bit value.

15. The method of claim 1, wherein the token comprises an 256-bit value.

16. The method of claim 1, wherein the token comprises a random value.

17. The method of claim 1, wherein the node identifier is a phone number.

18. The method of claim 1, wherein the first message is received through a cellular network interface.

19. The method of claim 18, wherein the first message is a short message service message.

20. The method of claim 1, wherein the second message is received through an internet protocol network interface.

21. The method of claim 20, wherein the second message is an internet protocol session request.

22. A method for session establishment, comprising:
dispatching a first message including a first value and a second value, wherein a node identifier is derivable from the first message;
dispatching a second message, wherein the second message includes said first value and wherein the second message is a session initiation request message; and
receiving a token, wherein the token is created in response to determination that the second value corresponds to a registered user and the node identifier corresponds to a registered node, and wherein the token is dispatched in response to receipt of the second message and determination that the second message includes the first value.

23. The method of claim 22, wherein the first value is a random number.

24. The method of claim 22, further comprising retrieving the second value from a storage element.

25. The method of claim 24, wherein the storage element is a radio frequency identification tag.

26. The method of claim 24, wherein the storage element is a smartcard.

27. The method of claim 22, wherein the first value is calculated based on the second value.

28. The method of claim 22, further comprising dispatching one or more messages including the token.

29. The method of claim 28, wherein the messages including the token are considered to be associated with a session.

30. The method of claim 28, wherein one or more of the messages including the token correspond to locations visited by a user.

31. The method of claim 30, wherein one or more of the messages including the token include data read from one or more storage elements at one or more of the locations.

32. The method of claim 30, wherein one or more of the messages including the token are considered to be indicative that one or more of the locations have been visited.

33. The method of claim 28, wherein one or more of the messages including the token correspond to tasks performed by a user.

34. The method of claim 33, wherein one or more of the messages including the token include data corresponding to one or more of the tasks.

35. The method of claim 22, wherein the token comprises an 128-bit value.

36. The method of claim 22, wherein the token comprises an 256-bit value.

37. The method of claim 22, wherein the token comprises a random value.

38. The method of claim 22, wherein the node identifier is a phone number.

39. The method of claim 22, wherein the first message is dispatched over a cellular communications network.

40. The method of claim 39, wherein the first message is a short message service message.

41. The method of claim 22, wherein the second message is dispatched over an internet protocol network.

42. The method of claim 41, wherein the second message is an internet protocol session request.

43. A system for session establishment, comprising:
a memory having program code stored therein; and
a memory having program code stored therein; and
a processor disposed in communication with the memory for carrying out instructions in accordance with the stored program code;
wherein the program code, when executed by the processor, causes the processor to perform:
receiving a first message including a first value and a second value;
deriving from the first message a node identifier;
determining if the second value corresponds to a registered user;
determining if the node identifier corresponds to a registered node;
creating a token in response to determination that the first message was initiated by a registered user with a registered node;
receiving a second message. wherein the second message is a session initiation request message; and
dispatching the token in response to receipt of the second message and determination that the second message includes the first value.

44. The system of claim 43, wherein the first value is a random number.

45. The system of claim 43, wherein the second value was retrieved by a user node from a storage element.

46. The system of claim 45, wherein the storage element is a radio frequency identification tag.

47. The system of claim 45, wherein the storage element is a smartcard.

48. The system of claim 43, wherein the first value is calculated based on the second value.

49. The system of claim 43, wherein the processor further performs receiving one or more messages including the token.

50. The system of claim 49, wherein the messages including the token are considered to be associated with a session.

51. The system of claim 49, wherein one or more of the messages including the token correspond to locations visited by a user.

52. The system of claim 51, wherein one or more of the messages including the token include data read from one or more storage elements at one or more of the locations.

53. The system of claim 51, wherein one or more of the messages including the token are considered to be indicative that one or more of the locations have been visited.

54. The system of claim 49, wherein one or more of the messages including the token correspond to tasks performed by a user.

55. The system of claim 54, wherein one or more of the messages including the token include data corresponding to one or more of the tasks.

56. The system of claim 43, wherein the token comprises an 128-bit value.

57. The system of claim 43, wherein the token comprises an 256-bit value.

58. The system of claim 43, wherein the token comprises a random value.

59. The system of claim 43, wherein the node identifier is a phone number.

60. The system of claim 43, wherein the first message is received through a cellular network interface.

61. The system of claim 60, wherein the first message is a short message service message.

62. The system of claim 43, wherein the second message is received through an internet protocol network interface.

63. The system of claim 62, wherein the second message is an internet protocol session request.

64. A system for session establishment, comprising:
a memory having program code stored therein; and
a processor disposed in communication with the memory for carrying out instructions in accordance with the stored program code;
wherein the program code, when executed by the processor, causes the processor to perform:
dispatching a first message including a first value and a second value, wherein a node identifier is derivable from the first message;
dispatching a second message, wherein the second message includes said first value and wherein the second message is a session initiation request message; and
receiving a token, wherein the token is created in response to determination that the second value corresponds to a registered user and the node identifier corresponds to a registered node, and wherein the token is dispatched in response to receipt of the second message and determination that the second message includes the first value.

65. The system of claim 64, wherein the first value is a random number.

66. The system of claim 64, wherein the processor further performs retrieving the second value from a storage element.

67. The system of claim 66, wherein the storage element is a radio frequency identification tag.

68. The system of claim 66, wherein the storage element is a smartcard.

69. The system of claim 64, wherein the first value is calculated based on the second value.

70. The system of claim 64, wherein the processor further performs dispatching one or more messages including the token.

71. The system of claim 70, wherein the messages including the token are considered to be associated with a session.

72. The system of claim 70, wherein one or more of the messages including the token correspond to locations visited by a user.

73. The system of claim 72, wherein one or more of the messages including the token include data read from one or more storage elements at one or more of the locations.

74. The system of claim 72, wherein one or more of the messages including the token are considered to be indicative that one or more of the locations have been visited.

75. The system of claim 70, wherein one or more of the messages including the token correspond to tasks performed by a user.

76. The system of claim 75, wherein one or more of the messages including the token include data corresponding to one or more of the tasks.

77. The system of claim 64, wherein the token comprises an 128-bit value.

78. The system of claim 64, wherein the token comprises an 256-bit value.

79. The system of claim 64, wherein the token comprises a random value.

80. The system of claim 64, wherein the node identifier is a phone number.

81. The system of claim 64, wherein the first message is dispatched over a cellular communications network.

82. The system of claim 81, wherein the first message is a short message service message.

83. The system of claim 64, wherein the second message is dispatched over an internet protocol network.

84. The system of claim 83, wherein the second message is an internet protocol session request.

85. An article of manufacture comprising a computer readable medium containing program code that when executed causes a wireless terminal to perform:
reading information from a storage element;
determining the storage element to serve as an identification tag for session initiation;
generating a random value;
dispatching, to a predetermined destination, a short message service message including the random value and some or all of the information; and
dispatching, to the predetermined location, a token request message including the random value.

86. The article of manufacture of claim 85, wherein the predetermined destination is defined in the information.

87. An article of manufacture comprising a computer readable medium containing program code that when executed causes a server to perform:
receiving a first message including a first value and a second value, wherein the first message is a short message service message;
deriving from the first message a node identifier;
determining if the second value corresponds to a registered user;
determining if the node identifier corresponds to a registered node;
creating a token in response to determination that the first message was initiated by a registered user with a registered node;
receiving a second message, wherein the second message is a session initiation request message: and
dispatching the token in response to receipt of the second message and determination that the second message includes the first value.

* * * * *